Figure 1:
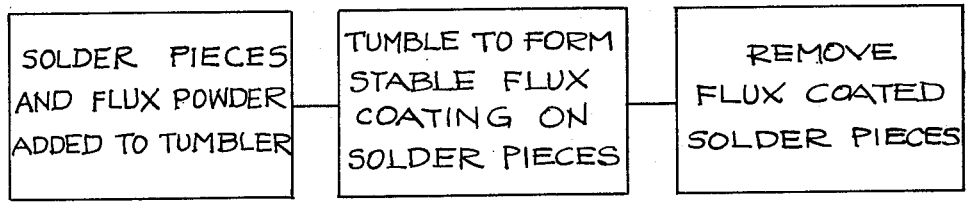

March 9, 1965   R. G. VARSANE   3,172,385
FLUX-COATED SOLDERING BODY AND METHOD OF MAKING THE SAME
Filed July 3, 1962

INVENTOR.
Robert G. Varsane
BY
Johnson and Kline
ATTORNEYS

_United States Patent Office_

3,172,385
Patented Mar. 9, 1965

3,172,385
FLUX-COATED SOLDERING BODY AND METHOD
OF MAKING THE SAME
Robert G. Varsane, Ansonia, Conn., assignor to Vitramon, Incorporated, Monroe, Conn., a corporation of Delaware
Filed July 3, 1962, Ser. No. 207,310
13 Claims. (Cl. 113—110)

This invention relates to soldering metallic bodies and to the solder and solder preforms used therein. More specifically, it pertains to a method of flux-coating such solder and solder preforms and to the resultant product.

As is well understood in the art of soldering metallic bodies, various solder compounds may be used depending upon the nature of the metals being soldered and the nature of the bond desired. Soldering compounds generally are relatively low-melting alloys of lead, copper or tin, depending upon the melting point desired, and may include other metals where electrical or other more specific characteristics are required in the bond. The soldering compounds are used together with a conventional flux such as borax, fluorspar or rosin, which promotes the fusion of the solder and which cleans the metal surfaces to be soldered and eliminates or prevents the formation of contaminating metallic oxides during the soldering process, by melting it at the joint to be soldered so that it bonds with each component of the joint.

Heretofore, in order to simplify soldering operations, particularly where the metal pieces to be soldered together were small or otherwise difficult to handle, solder preforms have been used which are prefabricated to conform to the shape of the metal pieces being soldered and/or contain only the desired quantity of solder. The preform may consist solely of solder in the desired shape, or may consist of a composite of solder together with one of the metals to be soldered.

The application of flux during the soldering process, whether using solder or solder preforms, has presented a problem since the flux is generally available in the form of a paste or jelly which is difficult to handle and apply, particularly in correct amounts and particularly in connection with small and delicate soldering operations.

For instance, in the manufacture of tiny electrical components such as resistors, thermistors, relays, inductors, capacitors and the like, minute conductive metallic pieces must be attached to each other by means of tiny conductive leads which must be soldered cleanly and with a minimum of solder deposit. Obviously this presents a difficult task, not only because of the small size of the materials used, but also because of the delicate nature and critical requirements of the electrical component being prepared.

It is therefore an object of the present invention to provide a solder, particularly a solder preform, which is coated with a predetermined amount of flux in clean dry condition and which is therefore easy to handle and use.

It is another object of this invention to provide a method for coating solder pieces, particularly solder preforms containing solder together with one of the metals to be soldered, with a dry, clean and stable flux coating containing a predetermined amount of flux.

It is still another object of the invention to provide a method for preparing novel minute solder and preforms containing flux which may be used to solder tiny and delicate metal pieces cleanly and simply by the application of heat without the use of additional flux and with a minimum solder deposit.

It is an advantage of this invention that the correct amount of solder and flux is supplied to the surfaces being joined and the possibility of applying incorrect amounts, which might result in an imperfect bonding or cause failure of the component being prepared, is avoided.

It is another advantage of the invention that a great number of minute solder pieces or solder preforms may be simultaneously coated with a flux material at a minimum of expense, time and effort.

Figure 2:
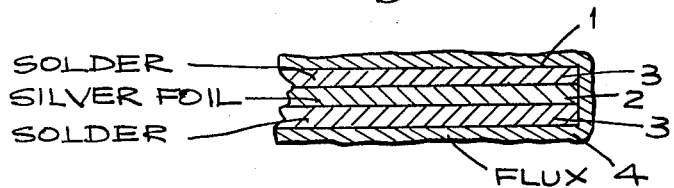

Other objects and advantages will be apparent from the specification and claims when considered in connection with the attached sheet of drawings, illustrating one form of the invention, in which:

FIGURE 1 is a flow sheet illustrating the three necessary steps in the process of coating solder pieces, such as preforms, with a surface coating of flux particles; and FIG. 2 is a diagrammatic cross-section, to an enlarged scale, of a flux-coated solder preform as prepared according to the present invention.

The basic concept of the present invention resides in the discovery that a dry clean flux compound may be caused to form a dry clean stable coating or layer on the surface of solder pieces of any size and shape provided that the flux compound is in finely divided form.

The flux coating or layer is preferably applied in the manner depicted by FIG. 1 of the drawing by (a) placing a number of solder pieces in a conventional tumbling container together with a quantity of powdered flux; (b) tumbling for the length of time necessary to form a coating or layer of the desired thickness or density; and (c) removing the flux-coated solder pieces. During the tumbling process the flux particles adhere to the surface of the solder pieces and as the period of tumbling increases additional flux particles adhere to the solder pieces and build up on each other to form thicker and denser flux coatings. Thus the flux coating may be closely controlled by means of the tumbling duration so that thinner or heavier coatings may be applied as required by the size of the solder pieces.

According to the preferred embodiment, the invention is applied to the art of soldering minute conductive silver parts for the production of electrical components as hereinbefore described, and the solder pieces employed are tiny solder preform leads having a length of about ½ inch, a width of about 15 mils and a thickness of about 6 mils. The preforms 1, as shown in FIG. 2 of the drawing, comprise a sandwich structure containing a layer 2 of silver foil of about 2 mil thickness between two layers 3 of solder coating of about 2 mil thickness each. The solder is electrically conductive and comprises an alloy of about 96.5% tin and 3.5% silver.

A large number of these solder preforms is placed in a tumbling container together with a large amount of finely divided pure water-white rosin flux such as powdered rosin which has been sifted through a 100 mesh screen. Tumbling is continued for a period of about 6 hours. The flux-coated preforms, as illustrated by FIG. 2 of the drawing, are covered with a dense coating or layer 4 comprising compacted and adhered flux particles which are bonded to the preform so tightly as to resist displacement during handling and even under the effects of heavy rubbing pressure.

The flux-coated preforms contain the required amount of solder and flux and may be used to form a conductive lead between tiny conductive metal pieces. This is accomplished cleanly and simply by placing the preforms in the desired position in contact with the two conductive metal pieces to be joined and heating to a temperature sufficient to melt the solder and flux while maintaining the silver layer of the preform and the conductive metal pieces in unmelted condition. Upon cooling, a clean permanent bond is formed between the silver lead and the conductive metal pieces with which it has contact.

As is obvious to those skilled in the art, the requirements with respect to the particle size of the flux and the duration of the tumbling step depend upon the size of the solder pieces being coated since the amount of flux which is required depends upon the amount of solder in the piece. For heavier solder pieces obviously the particle size of the flux may be increased and the duration of tumbling should be increased to many hours in order to deposit a heavier coating of flux.

According to the preferred embodiment which involves the use of minute solder pieces such as the aforementioned solder preforms, the particle size of the powdered rosin should not exceed about 50 mesh and preferably should not exceed about 100 mesh. There is no limit on the minimum size of the particles which may be used. As for the duration of the tumbling process, it is necessary to tumble a sufficient length of time to produce the density of flux coating desired and this will depend to some degree upon the type of tumbling device used and the number and size of the solder pieces being coated. Generally the tumbling time may vary from about 1 to about 7 or more hours depending upon the specific requirements.

The preferred flux agent for use in accordance with the present invention is rosin in its pure water-white form. This material provides excellent results apparently because of its properties as a natural gum. Thus it has adhesive properties whereby it bonds firmly to the solder pieces and also bonds firmly with itself whereby the flux particles are allowed to build up and form a coating of any desired thickness on the surface of the solder pieces.

However, it should be pointed out that flux materials other than rosin may be used, provided that they have the ability to adhere to solder and to build up and form a coating thereon, and that conventional flux materials not having this ability may be used together with the rosin or with any other finely divided tacky resinous binder material having the ability to bond the flux to the solder.

Thus any flux may be used provided that it is a solid at room temperature, may be reduced to finely divided powder form, and has the ability of adhering to itself and to solder. Rosin and the like gummy flux substances have this adhering ability because of natural tacky properties. Other flux substances have the adhering ability because of natural hygroscopic or oily properties. Still other flux substances which do not have a natural adhering ability may be suitably treated as by applying an electrostatic charge thereto whereby the particles are attracted to each other and to the solder.

Although the preferred embodiment of this invention relates to the production of minute electrical components wherein conductive solders or conductive preforms are used to bond conductive silver parts, it should be clearly understood that the many advantages of this invention apply equally well to the broad art of soldering one metal or joining it to another and that this invention includes within its scope the use of conductive preforms and solders other than those specifically disclosed as well as non-conductive preforms and solders.

Thus, among others, the several objects and advantages of the invention as aforenoted are achieved. Obviously numerous changes in the structure and method may be resorted to without departing from the spirit of the invention as defined by the claims.

I claim:

1. The method of producing flux-coated solder which comprises mixing together a solid solder body and a quantity of finely divided flux composition having an affinity for said solder, and agitating said mixture for a period of time sufficient to cause said flux composition to form a relatively stable coating on the surface of said solder body.

2. The method of claim 1 wherein the flux composition comprises rosin.

3. The method of claim 1 wherein the flux composition consists of particles no larger than about 50 mesh.

4. The method of producing flux-coated solder which comprises mixing together a quantity of solid solder preforms and a quantity of finely divided flux composition having an affinity for said solder preforms and comprising rosin particles no larger than about 50 mesh, and agitating said mixture for a period of time sufficient to cause said flux composition to form a relatively stable coating on the surface of said solder bodies.

5. The method of claim 4 in which said solid solder preform comprises a layer of solder applied over a layer of metal having a melting point in excess of the melting point of said solder.

6. The method of producing flux-coated solder preforms which comprises mixing together a quantity of solid solder preforms and a quantity of finely divided flux composition having an affinity for said solder preforms and comprising particles no larger than about 100 mesh, and agitating said mixture for from about 1 to about 7 hours to cause said flux composition to form a relatively stable coating on the surface of said solder bodies.

7. The method of claim 6 wherein the flux composition comprises rosin.

8. A flux-coated solder body which comprises a solid solder body having substantially smooth uninterrupted dry surfaces, a dry, relatively stable coating of flux composition having an affinity for said solder on at least one of said surfaces thereof, said coating being made up of a number of finely divided particles of said flux composition.

9. A flux-coated solder body in accordance with claim 8 in which said solid solder body is a solder preform.

10. A flux-coated solder body in accordance with claim 8 in which said solid solder body is a solder preform comprising a layer of solder applied over a layer of metal having a melting point in excess of the melting point of said solder.

11. A flux-coated solder body which comprises a solid solder body having substantially smooth uninterrupted dry surfaces, a dry, relatively stable coating of rosin flux composition having an affinity for said solder body on at least one of said surfaces thereof, said coating being made up of a number of finely divided rosin particles.

12. A flux-coated solder body in accordance with claim 11 in which said solid solder body is a solder preform.

13. A flux-coated solder body in accordance with claim 11 in which said solid solder body is a solder preform comprising a layer of solder applied over a layer of metal having a melting point in excess of the melting point of said solder.

References Cited by the Examiner

UNITED STATES PATENTS

| | | | |
|---|---|---|---|
| 255,344 | 3/82 | Small | 113—110 |
| 1,202,115 | 10/16 | Stern | 113—110 |
| 2,362,893 | 11/44 | Durst | 113—110 |

CHARLES W. LANHAM, *Primary Examiner.*